United States Patent [19]

Watanabe

[11] 4,027,887

[45] June 7, 1977

[54] TOY PHONOGRAPH WITH AUTOMATIC PICKUP ARM RETURN MEANS

[75] Inventor: Katsumi Watanabe, Kawasaki, Japan

[73] Assignee: Yugen Kaisha Watanabe Kenkyusho, Japan

[22] Filed: May 17, 1976

[21] Appl. No.: 686,719

[30] Foreign Application Priority Data

Jan. 3, 1976 Japan .............. 51-22030

[52] U.S. Cl. .............. 274/1 A; 274/1 L; 274/15 R
[51] Int. Cl.² .............. A63H 3/33; G11B 17/06
[58] Field of Search .............. 274/1 A, 1 L, 15 R

[56] References Cited

UNITED STATES PATENTS

| | | | |
|---|---|---|---|
| 1,219,144 | 3/1917 | Para | 274/15 R |
| 3,529,832 | 9/1970 | Goetz et al. | 274/15 R |
| 3,589,735 | 6/1971 | Watanabe | 274/1 A |
| 3,984,111 | 10/1976 | Hughes | 274/1 A |

FOREIGN PATENTS OR APPLICATIONS 2,305,024   6/1974   Germany .............. 274/1 A

*Primary Examiner*—Steven L. Stephan
*Attorney, Agent, or Firm*—Basile, Weintraub & VanOphem

[57] ABSTRACT

For automatically returning a pickup arm to a predetermined starting position on the perimeter of a record disc on a motor-driven turntable upon completion of playback, a drive gear is mounted on a turntable shaft for simultaneous rotation with the turntable. A driven gear, integrally formed with a cam, is mounted on a pivotal arm for movement into and out of engagement with the drive gear. When the pickup arm travels to a terminal position on the record discs, during playback, the driven gear is thereby urged into engagement with the drive gear and is, thus, set in rotation with the cam. The rotating cam causes the pickup arm to be lifted off the record disc and, then, to be spring returned from the terminal to the starting position. The record disc used herein is of the type having a plurality of grooves formed therein in the shape of nested spirals, for successive or random playback.

7 Claims, 3 Drawing Figures

TOY PHONOGRAPH WITH AUTOMATIC PICKUP ARM RETURN MEANS

BACKGROUND OF THE INVENTION

1. Field of the Invention

This invention relates to simplified sound reproducing apparatus, and in particular, to a toy phonograph wherein the mechanical vibrations set up in a reproducing stylus by the undulations in a record groove are transmitted, without conversion into electrical signals, to a diaphragm to cause same to emanate the corresponding sound waves. Even more particularly, the invention pertains to an improved mechanism for automatically returning the pickup arm of such a phonograph to a predetermined starting position on the perimeter of the record upon completion of playback.

2. Prior Art

In a well known example of toy phonographs having a battery-powered electric motor for driving a turntable, the motor is manually switched on when the pickup arm is in a predetermined starting position on the record on the turntable and, the motor is automatically switched off when the pickup arm reaches a predetermined terminal position on the record upon completion of playback. The pickup arm is spring returned to the starting position only when its stylus is manually disengaged from the groove in the record, as, for example, by the depression of a push button. Thus, unless the push button is depressed upon completion of playback, the pickup arm is held in the terminal position with its return spring in a state of maximum loading.

In order to overcome this defect, and to cause automatic return of the pickup arm from the terminal to the starting position, it has been suggested in the prior art to fixedly mount a cam on top of the record on the turntable for simultaneous rotation therewith. The cam is substantially cylindrical or disc-like in shape, with its top so-shaped as to provide a sloping edge along the circumference. As the pickup arm reaches the terminal position on the record upon completion of playback, a cam follower is thereby urged to ride onto the rotating cam at its lowest point and is subsequently raised to cause the pickup arm to have its stylus-carrying end lifted away from the record and, then, to be spring returned to the starting position.

This type of automatic pickup arm return mechanism makes the toy phonograph inordinately expensive to manufacture, because its various working parts must be formed to close tolerances and assembled precisely in their predetermined relative positions in order that the cam follower may ride onto the rotating cam at its lowest point when the pickup arm reaches the terminal position on the record. Furthermore, the pickup arm return mechanism of the prior art does not lend itself for use with records having a multiplicity of nested spiral grooves. It should be noted that these deficiencies of the prior art pickup arm return mechanism arise essentially from the fact that the cam is mounted on the record, or on the turntable, for simultaneous rotation therewith.

OBJECTS OF THE INVENTION

It is an object of this invention to provide a phonograph of the kind specified, including an automatic pickup arm return mechanism, which is greatly simplified and inexpensive in construction; easy to assemble, and positive in operation.

Another object of the invention is to provide an automatic pickup arm return mechanism which is equally applicable for use with either a phonograph record having a single groove in the form of a multiturn spiral, or with a phonograph record having a plurality of grooves in the form of nested spirals.

A further object of the invention is to provide an automatic pickup arm return mechanism the various parts of which need not be finished to close tolerances for successful operation.

A still further object of the invention is to provide a phonograph suitable for use with a record having a plurality of nested spiral grooves storing different sentences or the like, the phonograph being capable of playing back such sentences or the like either continuously or only one at a time.

SUMMARY OF THE INVENTION

The present invention provides, in a phonograph of the kind specified, an automatic pickup arm return mechanism comprising: (a) a drive wheel rotatable with a turntable, (b) a driven wheel rotatably mounted on a carriage, such as a pivotal arm, and adapted to be moved into engagement with the drive wheel by a pickup arm as the latter travels from a predetermined starting to a terminal position on a record on the turntable, (c) a cam rotatable with the driven wheel, and (d) a cam follower actuated by the cam when the pickup arm reaches the terminal position for causing a reproducing stylus carried by the pickup arm to disengage a groove in the record and, thus, to permit the pickup arm to be spring returned to its starting position.

For disengagement of the stylus from the record groove in the terminal position of the pickup arm, the record, and, therefore, the turntable, may be moved away from the stylus. Alternatively, the stylus carrying end of the pickup arm may be lifted away from the record. For simplicity of construction, however, the latter alternative is preferred and is adopted in a preferred embodiment of the invention hereinafter described.

Also in a preferred embodiment of the invention, the drive and driven wheels comprise gears having intermeshing teeth so that the rotation of the turntable may be positively transmitted to the cam through the intermeshing teeth. A possible alternative, although less preferred, contemplates frictional engagement of the drive and driven wheels. However, the frictional contact between the drive and driving wheels must be maintained by the pickup arm with its stylus engaged in the record groove.

A further feature of the invention resides in a switch system through which an electric motor for driving the turntable is connected to a power supply such as a battery. The switch system comprises a normally open manual start switch and a holding switch connected in parallel with the start switch. The holding switch is held open by the pickup arm when it is in the starting position on the record. The holding switch is closed automatically as the pickup arm travels a predetermined slight distance from the starting position toward the terminal position during closure of the start switch. The motor is, therefore, automatically switched out of rotation when the pickup arm returns to the starting position upon completion of playback. This switch system is particularly advantageous when the record in use is of the type having a plurality of nested spiral grooves, because it enables the sentences or the like stored in the respective grooves to be played back either continuously or only one at a time. For continuous playback the starting switch may be manually held in an actuated state regardless of the repeated opening and closing of the holding switch.

The phonograph of the above specified type and class is suitable to be embodied in a doll or like toy, and in this application of the phonograph, the record irreplaceably mounted therein is, preferably, of the type having a plurality of grooves cut in the shape of nested spirals. By a simple manipulation such as, for example, the depression of a pushbutton switch, a child may cause the doll to speak or pronounce a number of different sentences or other sound recorded in the separate grooves in the record.

The above and various other objects, features, and advantages of this invention will become more clearly apparent in the course of the following description, which is to be read in connection with the accompanying drawings. In the drawing, like reference characters refer to like parts throughout the several views, in which:

DESCRIPTION OF THE PREFERRED EMBODIMENT

Figure 1:
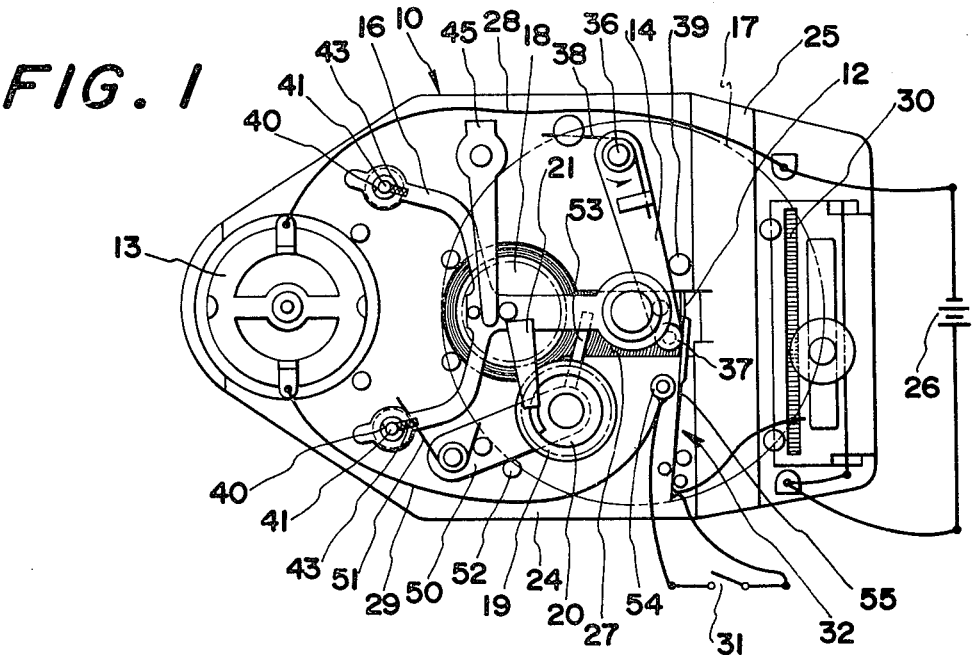
FIG. 1 is a plan view of a toy phonograph according to this invention, with a top cover thereof removed.
Figure 2:
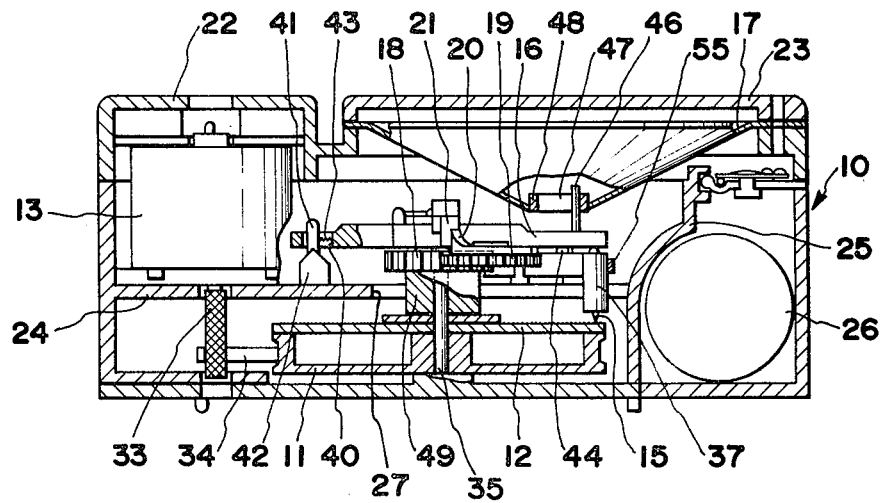
FIG. 2 is a view showing the casing of the toy phonograph of FIG. 1 in vertical section and, also, showing, partly in side elevation, and partly in cross-section, some essential parts within the casing.

As illustrated in its preferred form in FIGS. 1 and 2, the toy phonograph according to this invention broadly comprises a casing 10; a turntable 11 rotatably mounted on the bottom of the casing and having a disc-like record 12 thereon; a motor 13 for imparting rotation to the turntable; a pickup arm 14 carrying a reproducing stylus 15 for receiving mechanical vibrations from a spiral groove in the record 12; a Y-shaped intermediate vibrator 16 for transmitting the vibrations of the stylus to a diaphragm 17; a drive wheel 18 rotatable with the turntable 11; a driven wheel 19 movable into and out of engagement with the drive wheel; a cam 20 rotatable with the driven wheel 19, and a cam follower 21 connected to the intermediate vibrator and actuated by the cam.

With reference to FIG. 2, the casing 10 has its top semipermanently closed by a top cover 22, a part of which comprises a loudspeaker jacket 23 protectively covering the diaphragm 17, which is, perferably, conical in configuration. The annular marginal edge of the diaphragm 17 is disposed and sandwiched between the casing 10 and the jacket 23. The casing 10 further includes a platform 24 on which is mounted the motor 13, pickup arm 14 and other parts of the phonograph, as will subsequently be detailed. The casing is, also, configured to define a partition 25 which defines a space for accommodating a two-cell battery 26. The battery 26 is used as a power supply for feeding the motor 13. The platform 24 has an opening 27, defining a circular portion axially aligned with the turntable 11 therebelow, and another portion extending therefrom in the radial direction of the turntable.

FIG. 1 schematically illustrates an electric circuit through which the motor 13 is energized by the power supply 26. The circuit includes a pair of conductors 28 and 29 connecting the opposite polarity terminals of the power supply 26 to the motor 13. Also, included in the circuit are a variable resistor 30 and a parallel connection of manual start or starting switch 31 and holding switch 32. This electric circuit is conventional except for the start switch 31 and the holding switch 32, which will be later described in more detail.

As shown in FIG. 2, the motor 13 has a knurled output shaft 33. An endless belt 34 extends around the motor output shaft 33 and the rim of the turntable 11 for transmitting motor rotation to the turntable. The turntable 11 is rotatably mounted on an upright shaft 35 erected approximately centrally on the bottom of the casing 10. The record or disc 12 is irreplaceably mounted on the turntable 11 for simultaneous rotation therewith and is centered about the shaft 35 which, in turn, extends through a hole at the center of the record.

The record 12 is of the known type having a plurality of grooves cut therein in the form of nested spirals, each spiral groove being one or more revolutions in length. It is possible, however, to employ a usual record having a single groove in the shape of a multiturn spiral in the illustrated embodiment of the invention.

The pickup arm 14 is pivotally supported at one end thereof, as at 36, on the platform 24. As its other or free end, the pickup arm 14 has a pickup or head 37 angled downwardly and extending through the opening 27 in the platform 24. The head 37 carries the reproducing stylus 15 at its bottom end. The stylus 15 is adapted to ride in any one of the several spiral grooves in the record 12. A torsion spring 38 biasses the pickup arm 14 counterclockwise, as viewed in FIG. 1. The counterclockwise turn of the pickup arm is limited in its starting position on the record 12 by an upstanding stop 39 formed on the platform 24.

As clearly seen in FIG. 2, th stylus 15 is engaged in one of the grooves in the record 12 when the pickup arm 14 is held in its stand by or starting position. When the turntable 11 is set in rotation, the pickup arm 14 immediately starts traveling toward a predetermined terminal position on the record 12 against the bias of the torsion or return spring 38. The stylus 15 follows the groove in the record to receive mechanical vibrations therefrom corresponding to its undulations. The return spring 38 is, also, effective to slightly bias the stylus carrying end of the pickup arm 14 upwardly, i.e., away from the record 12, for reasons hereinafter made apparent.

The Y-shaped intermediate vibrator 16 comprises a relatively wide stem extending along the opening 27 in the platform 24, and a pair of divergent arms terminating in eyes 40. The eyes 40 receive, with considerable clearance, respective, pins 41 mounted uprightly on the platform 24. Each pin 41 has an enlarged lower end portion 42, (FIG. 2) for holding the arms of the intermediate vibrator 16 at a desired height from the platform 24. A pair of compression springs 43 are arranged between the vibrator arms and the pins 41, respectively, for urging the intermediate vibrator 16 toward the right as seen in the drawing.

The stem of the intermediate vibrator 16 slidably rides over a boss 44 formed on the pickup arm 14, the vibrator stem being designed to remain in sliding contact therewith throughout the course of travel of the pickup arm from its stating to terminal position on the record 12. A leaf spring 45 secured at one end to the platform 24 engages the intermediate vibrator 16 at its other end to exert downward pressure thereon, and hence on the stylus carrying end of the pickup arm 14. The downward pressure is in opposition to the slight upward bias of the return spring 38. The stylus 15 is, therefore, normally urged into engagement with one of the grooves in the record 12.

It will be observed from FIG. 1 that the leaf spring 45 engages the intermediate vibrator 16 at one end of its stem where the divergent arms originate. This arrangement contributes toward constant speed rotation of the record 12 throughout the process of playback from each groove, because, were it not for the leaf spring 45, the stylus 15 would offer decreasing resistance of the record rotation as it travels from the starting to the terminal position in sliding contact with the groove. Since the intermediate vibrator 16 with its leaf spring 45 exerts increasing downward pressure on the pickup arm 14 as it travels toward the terminal position, the decreasing resistance that would otherwise be offered by the stylus 15 to record rotation in the absence of the leaf spring is compensated for.

With reference to FIG. 2, the stem of the intermediate vibrator 16 carries an upright pin 46 on its end remote from the divergent arms. The pin 46 is loosely received in an opening 47 formed at the apex of the conical diaphragm 17. Since the intermediate vibrator 16 is biassed rightward by the compression springs 43, as mentioned previously, the pin 46 is urged into contact with a reinforced edge 48 of the diaphragm bounding the opening 47.

Figure 3:
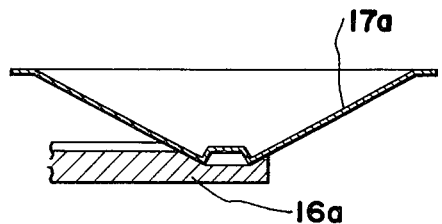
FIG. 3 is a vertical sectional view of a modified diaphragm and intermediate vibrator which can be employed in the toy phonograph of FIGS. 1 and 2.

In an alternate embodiment shown in FIG. 3, a diaphragm 17a is mounted directly on an intermediate vibrator 16a and is not itself supported by the phonograph casing 10. The illustrated diaphragms 17 and 17a are both conventional and do not, by themselves, constitute features of this invention. It may be mentioned, however, that these diaphragm constructions are preferable because they permit the intermediate vibrator 16 or 16a to smoothly move up and down relative to the record 12. Such up-and-down motion of the intermediate vibrator is necessary for automatically returning the pickup arm 14 to the starting position upon completion of playback from each groove, as will subsequently be described.

Thus, as the stylus 15 follows one of the grooves in the record 12 during rotation of the turntable 11, the mechanical vibrations imparted to the stylus by the undulations in the groove are transmitted to the diaphragm 17 or 17a via the pickup arm 14 and the intermediate vibrator 16 or 16a, with or without the pin 46. The diaphragm 17 or 17a transmits these vibrations to the air as sound waves.

For automatically returning the pickup arm 14 from the terminal to the starting position upon completion of playback from each groove, the drive wheel 18 is rotatably mounted on the turntable shaft 35 and rigidly connected to the record 12 via a spacer 49 for simultaneous rotation with the turntable. The driven wheel 19, which is coplanar with drive wheel 18, is rotatably mounted on one end of an arm 50. The arm or carriage means 50 is pivotally supported at its other end on the platform 24. In this particular embodiment, both drive and driven wheels 18 and 19 comprise gears, so that they will be hereinafter referred to as the drive and driven gears, respectively.

The arm 50 is pivotal toward and away from the drive gear 18 to move the driven gear 19 into and out of engagement therewith. The arm 50 is biassed to turn clockwise, as viewed in FIG. 1, by a torsion spring 51. The clockwise turning of the arm 50 is limited by an upstanding stop 52 formed on the platform 24, so that the arm is normally retained, as shown in the drawing, to hold the driven gear 19 out of engagement with the drive gear 18.

The arm 50 includes an offset extension 53 which intrudes into the path of the stylus 15 on the record 12 for engagement with the pickup arm 14 as the pickup arm travels close to the terminal position on the record. Upon engagement with the pickup arm 14, and the arm 50 is turned counterclockwise against the bias of the torsion spring 51 with the continued travel of the pickup arm to the terminal position, thereby moving the driven gear 19 into engagement with the drive gear 18. The driven gear 19 is, of course, set in rotation upon engagement with the drive gear 18.

Substantially disc-like, the cam 20 is fixedly mounted on, or integrally molded with, the driven gear 19 in coaxial relationship therewith. The cam follower 21 is secured at one end to the intermediate vibrator 16 or 16a and rests on the top of the cam 20 at its other end. Thus, as the cam 20 is rotated via the intermeshing gears 18 and 19, the cam follower 21 is relatively slidable over the top of the cam along its circumference.

As will be noted from FIG. 2, an upward slope of relatively short extent is formed on the top of the cam 20. When the cam follower 21 rides over this upward slope of the cam 20, the intermediate vibrator 16 or 16a is thereby raised against the downward pressure of the leaf spring 45. This permits the stylus to be lifted out of engagement with one of the record grooves owing to the slight upward pressure exerted on the pickup arm 14 by the return spring 38. With the stylus, thus, disengaged from the record groove, the pickup arm 14 automatically returns from the terminal to the starting position under the bias of the return spring 38. Upon return to the starting position, the pickup arm 14 has its stylus 15 immediately re-engaged in some of the record grooves.

The start switch 31 is a normally open switch and is, preferably, a pushbutton switch which can be located in any convenient position outside of the phonograph casing 10. The start switch 31 is, therefore, held closed only during depression of the push button. Connected in parallel with the start switch 31 is the holding switch 32. The holding switch 32 comprises a fixed contact 54 mounted on the platform 24, and a movable contact 55 comprising a resilient strip of electrically conducting material secured at one end to the platform 24 and self-biased into engagement with the fixed contact. The other end of the movable contact 55 extends across the opening 27 in the platform 24 so as to be pushed out of engagement with the fixed contact 54 by the pickup arm 14 when the pickup arm is in the starting position, as shown in FIG. 1.

It is to be noted that the movable contact 55 of the holding switch 32 is spaced only a minimum distance from the fixed contact 54 when the pickup arm 14 is in the starting position. Thus, for playback, the start switch 31 may be manually held closed for a brief length of time until the pickup arm 14 travels away from the starting position to such an extent that the holding switch 32 becomes automatically closed by virtue of the inherent resiliency of its movable contact 55. The electric circuit of the phonograph is thereafter held closed until the pickup arm 14 returns to the starting position upon completion of playback from one of the grooves.

OPERATION

While the operation of the toy phonograph according to this invention is believed clearly apparent from the preceding description, further amplification will be made in the following brief summary of such operation. With the pickup arm 14 held standing by in the starting position as shown in FIGS. 1 and 2, the stylus 15 is engaged in one of the grooves in the record 12. For starting playback, the start switch 31 may be manually activated to set the motor 13 in rotation.

The rotation of the knurled output shaft 33 of the motor 13 is transmitted to the turntable 11 via the endless belt 34, so that the turntable rotates with the record 12 thereon in a predetermined direction, which is clockwise as seen in FIG. 1. The pickup arm 14 starts traveling toward the terminal position against the bias of the return spring 38 as the stylus 15 follows the groove in which it has been engaged. The holding switch 32 is automatically closed almost immediately after the closure of the start switch 31, so that the turntable 11 can be maintained in rotation if the start switch is allowed to open following the start of playback.

The mechanical vibrations set up in the stylus 15 by the groove undulations of the rotating record 12 are transmitted to the diaphragm 17 or 17a (FIG. 3) via the pickup arm 14, boss 44, and intermediate vibrator 16 or 16a, with or without the pin 46. The diaphragm 17 or 17a converts the vibrations into audible sound.

Immediately before reaching the terminal position on the record 12, the pickup arm 14 engages the offset extension 53 of the arm 50. This causes the arm 50 to turn counterclockwise against the bias of the torsion spring 51 until the driven gear 19 engages the drive gear 18. The cam 20, then, starts rotation with the driven gear 19 when the pickup arm 14 arrives at the terminal position on the record. The cam follower 21 subsequently rides over the highest point on the slope of the cam 30 thereby lifting the intermediate vibrator 16 away from the record 12 against the downward pressure of the leaf spring 45.

With the stylus 15 thus disengaged from the record groove, the pickup arm 14 is permitted to return automatically to the starting position on the record under the bias of the return spring 38. Simultaneously, the arm 50 is turned clockwise by the force of the torsion spring 51, with the consequent disengagement of the driven gear 19 from the drive gear 18. The cam follower 21 is now located past the slope of the cam 20, so that the leaf spring 45 again exerts downward pressure on the pickup arm 14 in its starting position via the intermediate vibrator 16 or 16a. The turntable 11 is automatically set out of rotation upon return of the pickup arm 14 to the starting position because, then, the holding switch 32 is opened by the pickup arm to disconnect the motor 13 from the power supply 26.

As set forth previously, the record 12 for use in the toy phonograph according to the invention is preferably of the type having a plurality of grooves formed in the shape of nested spirals. Assuming that the starting point and terminal point of each of such spiral grooves are aligned in the radial direction of the record, and that the starting and terminal positions of the stylus 15 on the record are, also, in radial alignment, then, when the stylus 15 reaches the terminal point of one of the grooves upon completion of playback therefrom, the starting points of the grooves will be located in the same angular positions on the record as when the stylus was at the starting point of that groove. Since the record 12 rotates through a certain angle while the pickup arm 14 subsequently returns from the terminal to the starting position, the stylus on return to the starting position is not engaged in the same groove as before, but in a different one on the back of that groove with respect to the rotational direction of the record.

As the various working parts of the phonograph of this class are not manufactured to any close tolerances, the record grooves cannot usually be played back in an established sequence, but rather at random. Such randomness of playback is allowable, or often preferable, in the intended applications of the phonograph according to this invention. When the phonograph is embodied in a doll, for example, the entertainment provided by the doll will be enhanced by the element of surprise arising from the randomness with which it utters various recorded sayings. For continuous playback of such various sayings, the start switch 31 may be manually held closed in spite of the repeated opening and closing of the holding switch 32.

With the invention thus fully described, it is clear that the various objects as set forth above have been attained in a simple and practical manner. It is not desired, however, to limit the invention to the exact details of construction disclosed, as numerous modifications or changes will readily occur to those skilled in the art on the basis of this disclosure, without departing from the spirit or scope of the invention as sought to be defined in the following claims.

Having, thus, described the invention, what is claimed is:

1. In a phonograph of the type comprising a turntable rotatable with a record having at least one spiral groove formed therein, a pickup arm pivotally supported at one end and carrying at another end a reproducing stylus movable relatively into and out of engagement with the groove in the record, first spring means which biases the pickup arm toward a predetermined starting position on the record and against the bias of which the pickup arm is movable toward a predetermined terminal position on the record as the stylus follows the groove in the record for receiving mechanical vibrations therefrom during rotation of the turntable, and a diaphragm for converting the vibrations of the stylus into corresponding sound waves, an improved pickup arm return means, comprising:

a. a drive wheel rotatable with said turntable;
b. a driven wheel which is engageable by the drive wheel;
c. carriage means rotatably supporting said driven wheel and adapted to be actuated by said pickup arm when the pickup arm travels from said starting to said terminal position, the carriage means moving said driven wheel into engagement with said drive wheel, said driven wheel being adapted to be rotated by said drive wheel when in engagement therewith;
d. second spring means acting on said carriage means for normally holding said driven wheel out of engagement with said drive wheel;

e. a cam rotatable with said driven wheel;
f. a cam follower actuated by said cam when said pickup arm is in said terminal position for causing said stylus to disengage the groove in the record, and wherein said pickup arm is permitted to return to said starting position under the bias of said first spring means upon actuation of said cam follower by said cam, said cam being adapted to permit said stylus to re-engage the groove in the record upon return of said pickup arm to said starting position.

2. The phonograph as set forth in claim 1, further comprising:
a. an intermediate vibrator arranged over said pickup arm so as to remain in sliding contact therewith throughout the course of travel of said pickup arm from said starting to said terminal position for transmitting the vibrations of said stylus to said diaphragm, said intermediate vibrator being capable of movement toward and away from the record on said turntable;

said pickup arm being urged against said intermediate vibrator by said first spring means;

b. third spring means biasing said intermediate vibrator toward the record on said turntable for normally holding said stylus in engagement with the groove in the record, and
c. wherein said cam follower is effective, when actuated by said cam, to move said intermediate vibrator away from the record on said turntable against the bias of said third spring means and to permit said pickup arm to return from said terminal to said starting position.

3. The phonograph as set forth in claim 1, wherein: said carriage means is an arm pivotally supported at one end and rotatably supporting said driven wheel at another end, said arm being pivotable, when actuated by said pickup arm, toward said drive wheel against the bias of said second spring means for moving said driven wheel into engagement with said drive wheel.

4. The phonograph as set forth in claim 1, wherein: said cam is formed integral with said driven wheel.

5. In a phonograph of the type comprising a turntable rotatable with a record having a plurality of grooves formed therein in the shape of nested spirals, drive means including an electric motor for imparting rotation to the turntable, a pickup arm pivotally supported at one end and carrying at another end a reproducing stylus movable relatively into and out of engagement with the grooves in the record, first spring means which biases the pickup arm toward a predetermined starting position on the record and against the bias of which the pickup arm is movable toward a predetermined terminal position on the record as the stylus follows one of the grooves in the record for receiving mechanical vibrations therefrom during rotation of the turntable, and a diaphragm for converting the vibrations of the stylus into corresponding sound waves, an improved pickup arm return means, comprising:
a. a drive wheel rotatable with said turntable;
b. a driven wheel engageable by said drive wheel;
c. carriage means rotatably supporting said driven wheel and adapted to be actuated by said pickup arm, when the pickup arm travels from said starting to said terminal position, the carriage means moving said driven wheel into engagement with said drive wheel, said driven wheel being rotated by said drive wheel when in engagement therewith;
d. second spring means acting on said carriage means for normally holding said driven wheel out of engagement with said drive wheel;
e. a cam rotatable with said driven wheel;
f. a cam follower actuated by said cam when said pickup arm is in said terminal position for causing said stylus to temporarily disengage the groove in the record to thereby permit said pickup arm to return to said starting position under the bias of said first spring means;
g. switch means for causing said motor to impart rotation to said turntable when said pickup arm is in said starting position and to hold said turntable in rotation at least until said pickup arm return from said terminal to said starting position after following one of the grooves in the record, and wherein said stylus is enabled to engage a different one of the grooves in the record each time said pickup arm returns from said terminal to said starting position.

6. The phonograph as set forth in claim 5, wherein:
a. said motor is adapted to be fed from a power supply via an electric circuit;
b. said switch means comprises:
 1. a start switch connected in said electric circuit, said start switch being normally open and being closed only when being activated manually;
 2. a holding switch connected in parallel with said start switch, said holding switch being held open by said pickup arm when the latter is in said starting position and being closed automatically when said pickup arm travels a predetermined slight distance from said starting position toward said terminal position during closure of said start switch, and wherein said motor is automatically electrically disconnected from said power supply each time said pickup arm returns from said terminal to said starting position.

7. The phonograph as set forth in claim 6, wherein said holding switch comprises:
a. a fixed contact, and
b. a resilient strip of electrically conducting material self-biased into engagement with said fixed contact, said resilient strip being held out of engagement with said fixed contact by said pickup arm when the pickup arm is in said starting position.

* * * * *